May 17, 1966  C. W. ANDERSEN  3,251,254
DAMPER HEAD CUTTING MACHINE
Filed June 19, 1963  2 Sheets-Sheet 1
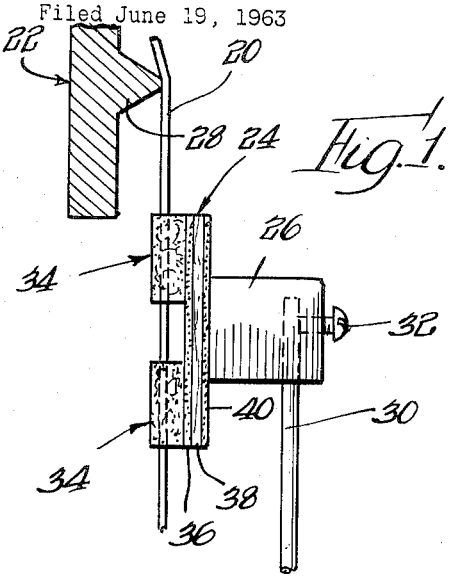
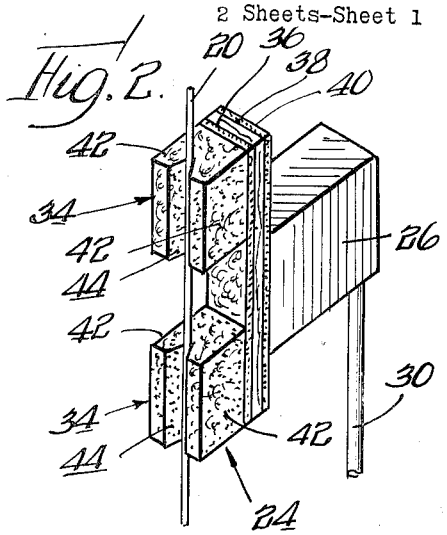
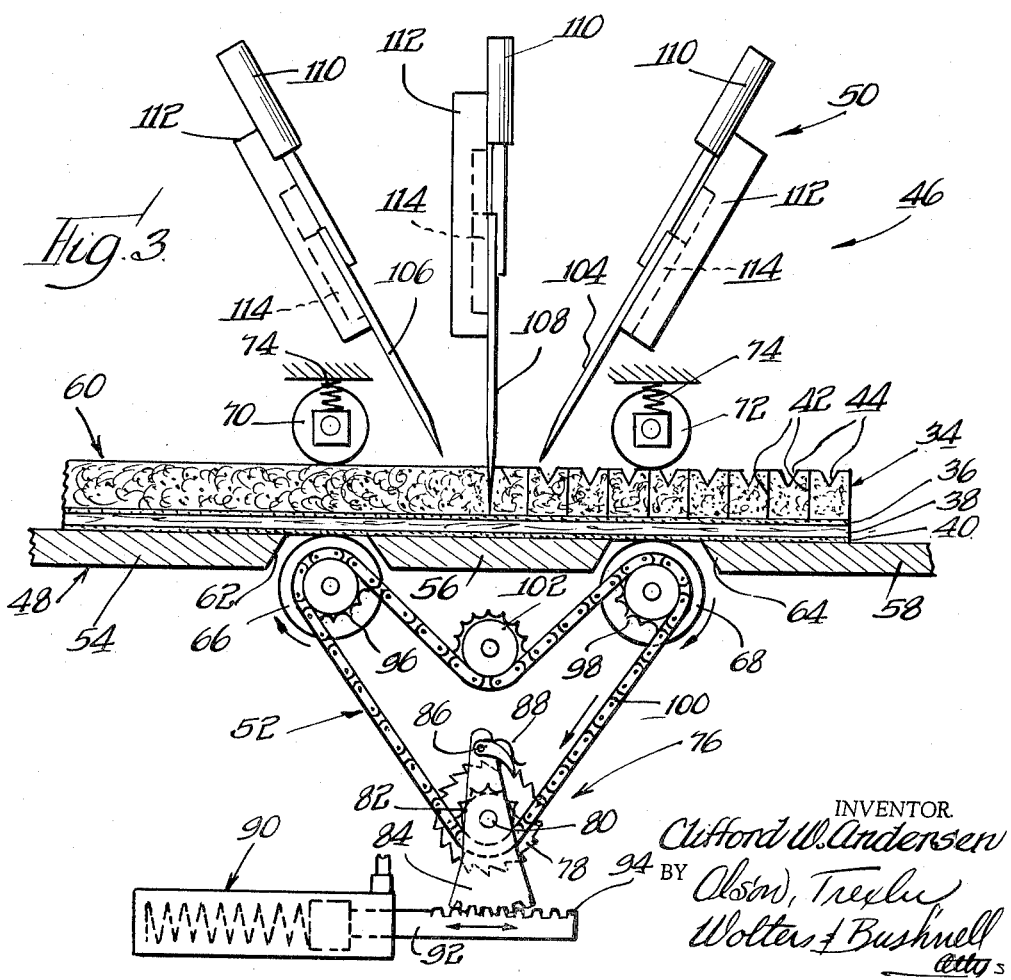
INVENTOR.
Clifford W. Andersen
BY Olson, Trexler
Wolters & Bushnell
attys

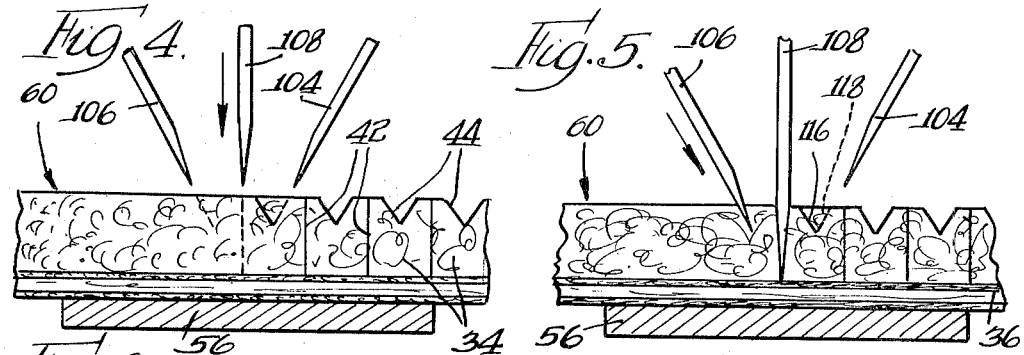
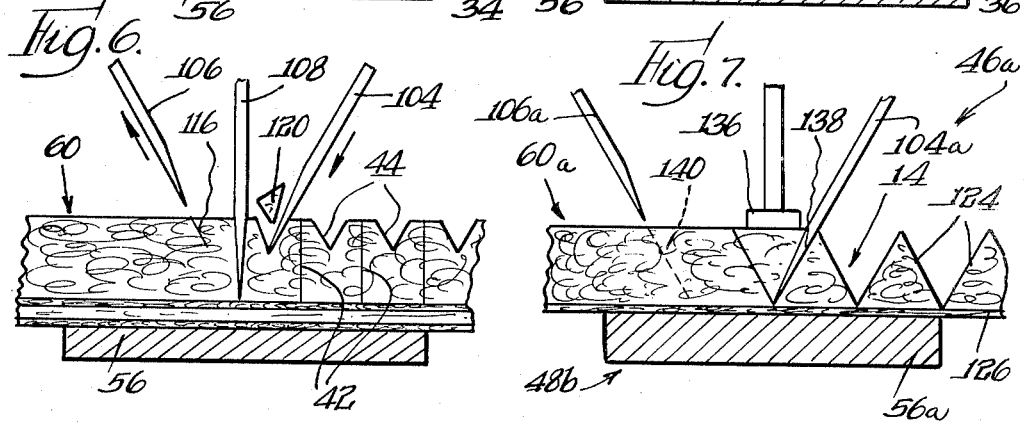
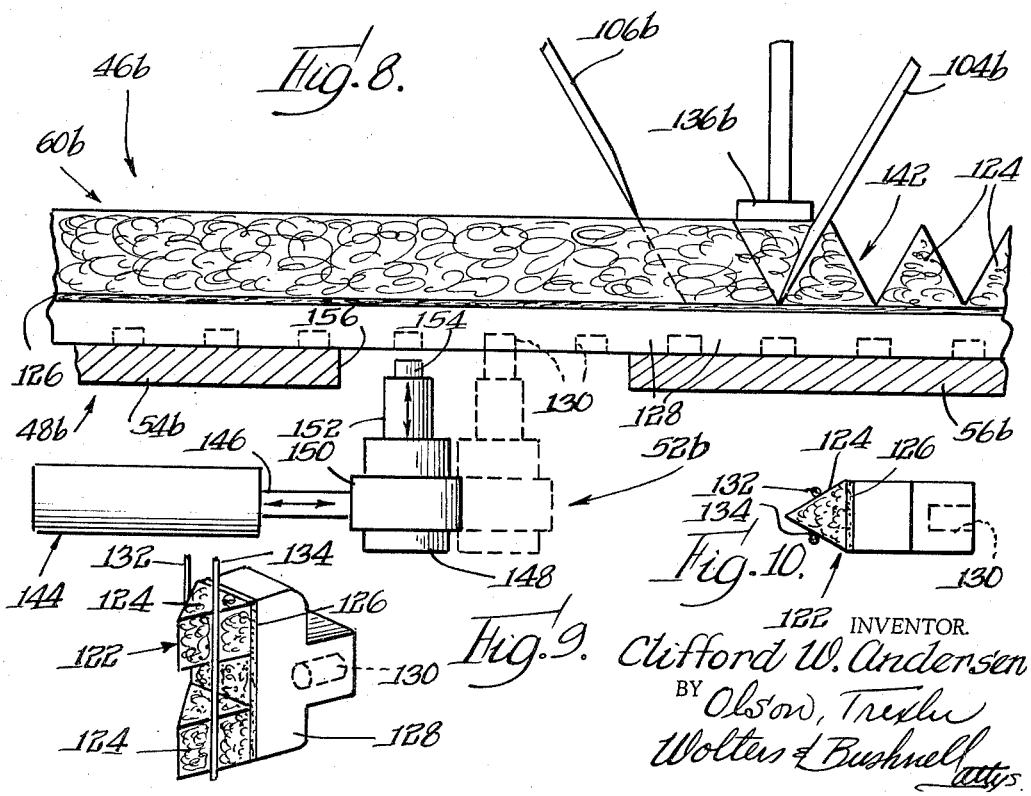

United States Patent Office 3,251,254
Patented May 17, 1966

---

3,251,254
DAMPER HEAD CUTTING MACHINE
Clifford W. Andersen, De Kalb, Ill., assignor to The Wurlitzer Company, Chicago, Ill., a corporation of Ohio
Filed June 19, 1963, Ser. No. 289,080
2 Claims. (Cl. 83—214)

This invention relates generally to the manufacture of pianos and relates more particularly to equipment for and methods of shaping the felt of cushioned heads to be assembled to that piano action component known as a damper lever.

A general object of the present invention is to provide new and improved apparatus for and methods of making damper heads, and a more specific object is to provide novel apparatus for and methods of cutting the felt for damper heads.

Another object of the invention is to provide novel apparatus for and methods of precisely cutting the felt for damper heads.

Still another object of the invention is to provide apparatus for and methods of manufacturing damper heads in which incisions are made in a preform strip while the same is in tension.

And still another object of the invention is to provide methods of and apparatus for accurately indexing a damper head preform relative to a cutting station.

Yet another object of the invention is to provide methods of and apparatus for accurately positioning a plurality of incisions in a preform strip in making damper heads therefrom.

And yet another object of the invention is to provide apparatus for and methods of positively restraining a preform strip while angulated incisions are made therein in forming damper heads therefrom.

These and other objects and features of the invention will become more apparent from a consideration of the following disclosure.

A method in accord with the invention includes horizontally aligning a preform strip, supporting the underside of the strip, incisingly engaging the strip at a region opposed to the supported underside thereof for positively positioning the same, making inclined cuts in the preform strip in continuation of the incising engagement, and releasing the strip.

Apparatus in accord with the invention includes a platform for supporting a preform strip against the advance of cutting means, the platform having spaced apertures for exposing correspondingly spaced portions of the preform strip. An indexing unit is provided for stepping the preform strip along the platform, and the indexing unit includes periodically operated drive rollers disposed in the apertures in the platform for engaging the preform strip. The apparatus also includes a first cutting element mounted for oscillation in a path normal to the plane of the platform for aggressively engaging the preform strip, a second cutting element mounted for oscillation in a path spaced from and inclined with respect to the path of the first cutting element, and a third cutting element mounted for oscillation in a path inclined with respect to the path of the first element and converging with the path of the second element whereby the third element cooperates with the second element in forming angled cuts in the preform strip.

In order that the principles of the invention may be readily understood, several embodiments thereof, but to which the application is not to be restricted, are shown in the accompanying drawings wherein:

FIG. 1 is a fragmentary view of an upright piano structure taken in side elevation and showing in particular a single string damper head constructed in accordance with the invention and illustrated as being attached to a damper block for operatively engaging a bass register piano string;

FIG. 2 is a perspective view of the damper head, damper block and piano string of FIG. 1;

FIG. 3 is a schematic, side elevational view of apparatus constructed in compliance with the principles of the present invention for use in making single string damper heads of the type shown in FIGS. 1 and 2;

FIGS. 4–6 illustrate three important steps in producing damper heads in compliance with the invention;

FIG. 7 is an elevational view similar to the showing of FIGS. 4–6 but illustrating the construction and operation of a modified form of the invention;

FIG. 8 is a schematic, side elevational view of another modified apparatus constructed in accordance with the invention, being particularly adapted to produce double string damper heads from a preform strip incorporating a wooden molding for use as an integral damper block;

FIG. 9 is a perspective view of a damper head and damper block cut from the finished product strip produced by the apparatus of FIG. 8; and FIG. 10 is a top plan view of the damper head and damper block of FIG. 9.

Referring now in detail to the drawings, specifically to FIGS. 1 and 2, a bass register piano string 20 of the wire-wrapped type is seen mounted to a piano frame 22 while a damper head 24 is adhesively attached to a damper block 26 for movement into damping engagement with the piano string 20 beneath the upper bridge 28 of frame 22. For purposes of directing the movement of damper head 24 into and out of engagement with the piano string 20, the damper block 26 is mounted to a piano action mechanism, not shown, by means of a damper wire 30 and a set screw 32.

The damper head 24 includes a pair of separate felt blocks 34 which take generally rectangular outline and which are adhesively secured to a felt band 36 in vertically spaced relationship. The felt band 36 is adhesively secured to one face of a narrow wooden reinforcing element 38, and a felt backing 40 is adhesively secured to the opposite face of the wooden element 38. In securing the damper head 24 to the damper block 26, the felt backing 40 is attached to the front face of the damper block using adhesive, alone or in conjunction with a metal fastener. Each of the felt blocks 34 is cut with parallel lateral faces or sides 42 and with a V-groove 44 opening from a face intermediate the sides 42, the felt blocks 34 being mounted to the felt band 36 with the grooves 44 in alignment with each other.

Apparatus for incising the lateral faces 42 and the grooves 44 in compliance with the invention is indicated generally by the numeral 46 in FIG. 3. The apparatus 46 includes a platform arrangement 48, a cutter unit 50 and an indexing unit 52. The platform arrangement 48 includes a feed table 54, a backup table 56 and a discharge table 58 which are horizontally disposed in the order named to receive and support a damper head preform strip that is indicated generally by the numeral 60. The strip 60 is built up from the various elements required for the damper heads 24, and the platform arrangement 48 is fashioned with spaced apertures 62 and 64 for exposing correspondingly spaced portions of the underside of preform strip 60. The apertures 62 and 64 are situated at the junctures between the backup table 56 and feed table 54 and discharge table 58 respectively. The apertures 62 and 64 are particularly intended to expose spaced portions of the preform strip 60 for incrementally advancing the same along the platform arrangement 48 in a manner to be described more fully hereinafter.

The indexing unit 52 is adapted to step the preform strip 60 in a horizontal path over the platform arrangement 48 generally from the feed table 54 to the discharge table 58. More specifically, the indexing unit 52 includes periodically operated aft and fore drive rollers 66 and 68 which are disposed respectively in the apertures 62 and 64 to engage the preform strip 60. In order to insure positive advance of the preform strip 60, the indexing unit 52 includes idler rollers 70 and 72 which vertically oppose the drive rollers 66 and 68 respectively. Furthermore, each of the idler rollers 70 and 72 is biased generally in the direciton of the corresponding drive roller by means of a compression spring 74 to pinch the preform strip 60 against the drive roller.

The indexing unit 52 additionally comprises an incremental, unidirectional drive 76 for the rollers 66 and 68. The drive 76 includes a ratchet wheel 78 which is mounted on a shaft 80. A sprocket 82 is rigidly and coaxially mounted to the ratchet wheel 78, and a sector gear 84 is pivotally mounted on shaft 80. A pawl 86 is pivotally mounted on sector gear 84 to be biased into meshing engagement with the teeth of ratchet wheel 78 by means of a leaf spring 88. In order to power the sprocket 82, the drive 76 includes a pneumatic jack 90, jack 90 incorporating an extensible and retractable piston rod 92 having a rack 94 fashioned thereon to mesh with the sector gear 84.

Sprockets 96 and 98 are rigidly and coaxially mounted to the rollers 66 and 68 respectively, and an endless chain 100 is disposed to interconnect sprockets 82, 96 and 98 for driving the rollers 66 and 68 from the jack 90. In the illustrated embodiment, jack 90 is of the single acting type. Power is applied to the sprocket 82 on the return or retraction stroke of the piston rod 92, and the pawl 86 rides freely over the teeth of ratchet wheel 78 on the extension stroke of piston rod 92, whereby the rollers 66 and 68 are driven incrementally and periodically. It is appreciated that the drive 76 may incorporate other types of unidirectional couplings such as a conventional one-way clutch.

An idler sprocket 102 may be disposed between the sprockets 96 and 98 to position the chain 100 in spaced relationship with respect to the backup table 56; and in compliance with a feature of the invention, the sprocket 98 is fashioned with fewer teeth and a smaller diameter than the sprocket 96 whereby to rotate the roller 68 at a somewhat greater speed than the roller 66. Thus, the roller 68 tends to draw tension into the section of the preform strip 60 which is situated between the roller 66 and the roller 68. This tensioning of the preform strip at the area which is to be cut, facilitates incising thereof.

The cutter unit 50 incorporates three oscillatable knives for incising the preform strip 60 to fashion the grooves 44 and the parallel lateral sides 42 of the felt blocks 34. These three knives specifically include an inclined front knife 104, an inclined rear knife 106 and a vertical medial knife 108. Each of these knives is reciprocated in a cutting path by means of a pneumatic jack 110; and movement of each knife is directed by a stationary guide bar 112, the cylinder of the associated jack 110 being affixed to the guide bar by suitable means and the respective knife being slidably coupled to its guide bar by means of a dove-tail slide 114. The vertical knife 108 is specifically mounted for oscillation in a path normal to the plane of the platform arrangement 48 above the backup table 56, and the stroke of knife 108 is selected to be of such a length that it cuts completely through the felt strips comprising the blocks 34 whereby to form the lateral sides 42 thereof. The edge of knife 108 is advantageously beveled on both sides for producing these deep cuts. The knives 104 and 106 are also mounted for oscillation in paths generally overlying the backup table 56; however, the paths through which the knives 104 and 106 are oscillated are inclined with respect to the path of knife 108 and converge relative to each other, the path of knife 108 generally bisecting the angle form between the paths of knives 104 and 106. The knives 104 and 106 are specifically arranged in this manner to form angled cuts in the preform strip whereby to develop the V-grooves 44. It is to be observed, with reference to FIG. 3, that the edges of knives 104 and 106 are beveled only on one side in order properly to form straight walls in the V-grooves 44. It will also be observed, with reference to FIG. 3, that while the paths of the knives 104 and 106 converge toward a point intersecting the path of vertical knife 108, the paths of knives 104 and 106 terminate short of actual intersection with the path of knife 108.

In order to enhance the understanding of the invention, the operation of the knives 104, 106 and 108 will now be described with reference to FIGS. 4–6; and it is important to point out that the operation which is to be described immediately hereinafter proceeds in compliance with the method aspects of the invention. Considering first FIG. 4, the knives 104, 106, and 108 will be seen disposed at a ready condition spaced above the preform strip 60 in preparation for incising advance into the preform strip.

The first step involves driving the vertical knife 108 downward into incising engagement with the preform strip using the associated jack 110, the knife 108 penetrating the felt material making up the blocks 34 and terminating at the upper surface of the felt material making up the band 36 as is shown in FIG. 5. Continuing with reference to FIG. 5, the second step will be seen to involve driving the inclined rear knife 106 into the felt material making up the blocks 34 to form a cut or incision illustrated at 116 in FIG. 6. The inclined front knife 104 is forcibly lowered into incising engagement with the preform strip 60 either simultaneously with the advance of knife 106 or simultaneously with the withdrawal of knife 106, knife 104 making an incision indicated in FIG. 5 by the numeral 118. The incision 118 which is made by knife 104 reaches into contact with an incision 116 made previously by knife 106 whereby to cut free a piece of scrap 120 shown in FIG. 6, thereby creating a V-groove 44.

It is important to observe, with reference to FIGS. 4–6, that the incisions 116 and 118 are made in the preform strip 60 in continuation of the penetrating engagement of the preform strip by the knife 108, knife 108 thereby holding the preform strip 60 in position while the inclined incisions are being made. After all three of the knives 104, 106, and 108 have been withdrawn from the preform strip 60, the pneumatic jack 90 will be actuated to drive the chain 100 and advance the preform strip in the general direction from feed table 54 to discharge table 58 by one incremental distance corresponding to the horizontal spacing between the lateral faces 42 of the felt blocks 34. At the end of such an incremental movement, the knife 104 will again be forcibly lowered by its operating jack and into incising engagement with the preform strip. It is to be realized that the described operation of apparatus 46 produces a series of individual damper heads which are interconnected by the unsevered bands 36, reinforcing elements 38 and backings 40 thereof; and when a damper head is desired to be separated from this product strip for assembly in a piano structure, it is to be understood that an appropriate cut will be made at the root of an incision made by knife 108 for releasing the individual part from the product strip.

While a particular embodiment of the invention has been thus far shown and described, it should be understood, of course, that the invention is not limited thereto since many modifications may be made. Therefore, and in order to further the understanding of the invention, modified embodiments are shown in FIGS. 7 and 8. In these modified embodiments as well as in the first-described embodiment, like numerals have been used to designate like parts, the suffix letter "a" being employed to distinguish those elements associated with the embodiment of FIG. 7 and the suffix letter "b" being used to characterize those elements associated with the embodiment of FIG. 8.

The embodiments of FIGS. 7 and 8 are both arranged for producing double-string damper heads; and turning to a consideration of FIGS. 9 and 10, a double-string damper head indicated generally by the numeral 122 is seen to include vertically aligned and spaced damper blocks 124 which are arranged to take triangular outline and which are adhesively secured to a felt band 126. The damper head 122 is mounted to a damper block 128 by adhesive or other suitable means, damper block 128 being fashioned with T-shaped section and with a rearwardly opening, cylindrical bore 130. The bore 130 is used in mounting the damper block and head assembly to a damper lever for use in transporting the damper head into and out of damping engagement with two adjacent, treble register piano strings 132 and 134. The modification of the instant apparatus which is shown in FIG. 7 is adapted to form double-string damper heads without attached damper blocks from a preform strip 60a whereas the apparatus shown in FIG. 8 is adapted to produce double-string damper heads with damper blocks attached from a preform strip 60b. Accordingly, the preform strip 60a includes a quantity of felt material for producing the triangular blocks 124 and a piece of felt material for producing the bands 126. Similarly, the preform strip 60b includes, in addition to the felt members for preform strip 60a, a wooden molding from which the damper blocks 130 may be severed. Advantageously, this wooden molding is formed with the bores 130 before the preform strip 60b is processed by the apparatus 46b.

With reference to FIG. 7, the apparatus 46a is seen to be characterized by the inclusion of a vertically oscillatable foot 136 instead of a vertical medial knife, foot 136 pressuringly engaging the preform strip 60a between the inclined knives 104a and 106a to hold the preform strip against the backup table 56a while the strip is being incised. Furthermore, the inclined paths of knives 104a and 106a are arranged to converge toward an imaginary point beneath the lower surface of the preform, the length of the paths of movement of the knives 104a and 106a being correspondingly altered to penetrate the preform strip 60a to the felt material making up the band 126. Thus, the knife 104a makes an incision 138 whereas the knife 106a makes an incision 140. The incisions 138 and 140 intersect to form a deep V-groove 142 in order to develop the triangular blocks 124.

The embodiment of FIG. 8 is similar in many respects to the embodiment of FIG. 7 and is particularly characterized by the special arrangement of indexing unit 52b. Unit 52b includes a pneumatic jack 144 which has a horizontally extensible and retractable piston 146. The unit 52b additionally includes a pneumatic jack 148 that is mounted on the piston 146 by a bracket 150, jack 148 having a vertically extensible and retractable piston 152. A cylindrical formation 154 is fashioned on the free end of piston 152, and the formation 154 is selected to be of a size and shape which are appropriate to the formation 154 entering the bores 130 which have been formed in the wooden molding that is to comprise the damper blocks 128. Advantageously, the feed table 54b and the backup table 56b are spaced to define a wide aperture 156 to permit the piston 152 access to the bores 130.

Incremental advance of the preform strip 60b will be achieved by actuating jack 144 to locate the jack 148 in the position shown in solid outline in FIG. 8. Thereafter, the jack 148 will be actuated to extend the piston 152 and locate the formation 154 in a bore 130. Thereafter, in continuation of this condition of jack 148, the jack 144 will be actuated to relocate the jack 148 into the position shown in broken outline in FIG. 8, thus advancing the preform strip 60b by a distance corresponding to the spacing between the individual damper heads. Thereafter, the jack 148 will be actuated to retract the formation 154 from engagement with the bore 130 to permit repositioning of the jack 148 to the starting location.

The specific examples herein shown and described are to be considered as being primarily illustrative. Various changes beyond those described will, no doubt, occur to those skilled in the art; and such changes are to be understood as forming a part of this invention insofar as they fall within the spirit and scope of the appended claims.

The invention is claimed as follows:

1. In apparatus to be used in making damper heads for a piano, the combination comprising: platform means for supporting a preform strip against the advance of cutting means, said platform means having an aperture for exposing a corresponding portion of said strip; means for stepping said preform strip along said platform means, including a horizontally extensible and retractable piston and a vertically extensible and retractable piston mounted on said horizontally extensible and retractable piston underlying the aperture in said platform means, said vertically extensible and retractable piston having a formation adapted drivingly to contact said preform strip upon extension into engagement therewith whereby to advance said preform strip upon extension of said horizontally extensible and retractable piston; a pressure foot mounted for oscillation in a path normal to the plane of said platform means whereby aggressively to engage said preform strip; a first cutting element mounted for oscillation in a path spaced from and inclined with respect to the path of said foot; and a second cutting element mounted for oscillation in a path inclined with respect to the path of said foot and converging with the path of said first cutting element whereby said second cutting element cooperates with said first cutting element in forming angled cuts in said preform strip.

2. In apparatus to be used in making damper heads for a piano, the combination comprising: platform means for supporting a preform strip against the advance of cutting means, said platform means having an aperture for exposing a corresponding portion of said strip; means for stepping said preform strip along said platform means, including a member underlying the aperture in said platform means and having a formation adapted drivingly to contact said preform strip upon extension into engagement therewith whereby to advance said preform strip; a pressure foot mounted for oscillation in a path normal to the plane of said platform means whereby aggressively to engage said preform strip; a first cutting element mounted for oscillation in a path spaced from and inclined with respect to the path of said foot; and a second cutting element mounted for oscillation in a path inclined with respect to the path of said foot and converging with the path of said first cutting element whereby said second cutting element cooperates with said first cutting element in forming angled cuts in said preform strip.

(References on following page)

References Cited by the Examiner

UNITED STATES PATENTS

| | | | |
|---|---|---|---|
| 348,763 | 9/1886 | Millet | 83—581 X |
| 1,751,549 | 3/1930 | Hope et al. | 83—5 |
| 1,965,341 | 7/1934 | Houston | 83—39 |
| 2,115,786 | 5/1938 | Poole | 83—282 X |
| 2,335,767 | 11/1943 | Kinports | 83—5 X |
| 2,708,968 | 5/1955 | Soave | 83—39 |
| 2,801,693 | 8/1957 | Loriz | 83—5 |

FOREIGN PATENTS

| | | |
|---|---|---|
| 684,996 | 12/1939 | Germany. |
| 513,536 | 2/1955 | Italy. |

WILLIAM W. DYER, JR., *Primary Examiner.*

ANDREW R. JUHASZ, *Examiner.*

L. B. TAYLOR, *Assistant Examiner.*